United States Patent
Watanabe

(10) Patent No.: US 7,496,292 B2
(45) Date of Patent: Feb. 24, 2009

(54) CAMERA SYSTEM

(75) Inventor: Mikio Watanabe, Asaka (JP)

(73) Assignee: Fujifilm Corporation, Tokyo (JP)

( * ) Notice: Subject to any disclaimer, the term of this patent is extended or adjusted under 35 U.S.C. 154(b) by 474 days.

(21) Appl. No.: 11/315,247

(22) Filed: Dec. 23, 2005

(65) Prior Publication Data
US 2006/0159447 A1    Jul. 20, 2006

(30) Foreign Application Priority Data
Jan. 20, 2005    (JP) ............................. 2005-013044

(51) Int. Cl.
G03B 7/26    (2006.01)
G03B 17/14    (2006.01)

(52) U.S. Cl. .................. 396/301; 396/529; 348/211.14; 348/231.6; 348/360; 348/372

(58) Field of Classification Search ................. 396/529, 396/532; 348/211.14, 360, 361
See application file for complete search history.

(56) References Cited

U.S. PATENT DOCUMENTS 4,782,393 A * 11/1988 Kawamura ............. 348/211.14

6,734,912 B1 * 5/2004 Kanayama et al. .......... 348/361

FOREIGN PATENT DOCUMENTS

JP    2000-106644 A    4/2000
JP    2001-16498 A    1/2001

* cited by examiner

Primary Examiner—W. B. Perkey
(74) Attorney, Agent, or Firm—Birch, Stewart, Kolasch & Birch, LLP

(57) ABSTRACT

The present invention provides a camera system including: an imaging unit which has an image-taking optical system and an image pickup device; and a main unit which receives image signals from the imaging unit and performs signal processing. The imaging unit includes an identification section for identifying the main unit. When the imaging unit is attached to the main unit and the power is supplied from the main unit to the imaging unit, the imaging unit issues to the main unit a request for the transmission of the identification code. In response to the request, the main unit sends the identification code to the imaging unit. The identification section of the imaging unit identifies the main unit based on the received identification code.

13 Claims, 6 Drawing Sheets

CAMERA SYSTEM

BACKGROUND OF THE INVENTION

1. Field of the Invention

The present invention relates to a camera system including: an imaging unit which has an image-taking optical system and an image pickup device; and a main unit which receives image signals from the imaging unit and performs signal processing.

2. Description of the Related Art

There has been proposed a camera system including a main unit and an imaging unit provided with an image-taking optical system and an image pickup device, which can take an image while maximizing the utilization of the image-taking function of the imaging unit by detachably attaching the imaging unit to the main unit. This type of camera systems may take images while freely changing a focal length, a focus range, etc. by selecting an imaging unit in a manner similar to the use of a conventional interchangeable lens, or may take color images by using an image pickup device having various color filters.

In order to put this type of camera systems into wide spread use in the future, it is necessary to design such a camera system that allows any of imaging units to be attached to a main unit to take images. One of techniques for realizing such a design is disclosed in Japanese Patent Application Publication No. 2000-106644 that proposes a main unit equipped with two or more processing means respectively operating for different types of image pickup devices.

The camera system of the above document can perform signal processing by using any one of the processing means provided in the main unit even if any of imaging units is attached to the main unit. In such a camera system however, even if an improper imaging unit (e.g. an imaging unit incompatible with the specification of the main unit, a completely counterfeit unit, etc.) is attached to the main unit, some kind of image processing may be performed by the processing means of the main unit when data of a taken image is sent to the main unit.

In order to address this problem, Japanese Patent Application Publication No. 2001-16498 proposes a camera system whose main unit includes: an identification section that identifies whether an imaging unit is proper or not when it is attached to the main unit; and a restriction section that restricts shooting according to the result of the identification performed by the identification section, thereby preventing an improper imaging unit from being attached to and used with a main unit.

In recent years however, because imaging units are becoming highly intelligent, there is a trend to provide main units with only the function of recording and reproducing images to make them as simple as possible. In the circumstances, providing a main unit with an identification section by employing the technique disclosed in Japanese Patent Application Publication No. 2001-16498 would oppose the trend.

Further, when main units are thus simplified, they can be sold at a low price so that many users can purchase them. Some users may possess various types of main units and select one of them according to the size of an imaging unit, or some users may possess various types of imaging units and borrow a main unit from somewhere according to one of various types of their own imaging units.

Under such circumstances, it is more likely that a proper imaging unit may be attached to an improper main unit rather than an improper imaging unit may be attached to a proper main unit.

SUMMARY OF THE INVENTION

The present invention has been made in view of the above circumstances, and provides a camera system capable of preventing a proper imaging unit from being attached to and used with an improper main unit to take an image.

A camera system according to the present invention includes:

an imaging unit which has an image-taking optical system and an image pickup device; and a main unit which receives image signals from the imaging unit and performs signal processing, wherein the imaging unit includes an identification section for identifying the main unit.

According to the camera system of the present invention, whether the main unit is proper or not can be determined by the identification section.

In this camera system, for example, operations such as shooting operation may be prohibited by the imaging unit when the main unit is identified as improper by the identification section and therefore it is possible to prevent shooting performed by attaching a proper imaging unit to an improper main unit.

Further, the imaging unit of this camera system may include a signal transmission restricting section that restricts signals to be sent to the main unit when the main unit is identified as improper by the identification section.

Even when a proper imaging unit is attached to an improper main unit to take an image, since the signal transmission restricting section can restrict signals to be sent to the main unit, for example by prohibiting the transmission of signals, image signals cannot be sent from the imaging unit to the main unit.

By configuring the camera system in this manner, it is possible to prevent shooting performed by attaching a proper imaging unit to an improper main unit.

However, if there is an improper main unit that does not fully match the specification of the imaging unit but enables shooting when attached thereto, prohibiting operation is not appropriate in such a case.

For example, if an imaging unit has an image pickup device whose pixel number is extremely large while a main unit has a frame rate insufficient to support such a large pixel number, the imaging unit cannot send all the pixels to the main unit. However, the imaging unit may perform processing for lowering the frame rate of the main unit or processing for thinning out the pixels so that image signals can be sent from the imaging unit to the main unit and the main unit can subject the received image signals to proper signal processing. In such a case, the camera system becomes more convenient if the imaging unit is so configured as to restrict signals by the signal transmission restricting section before the signals are sent to the main unit.

In this way, if the signal transmission restricting section is capable of restricting signals by prohibiting the transmission of the signals, by changing a frame rate, or by thinning out pixels, it is possible to realize a camera system in which the signal transmission restricting section not only disables an improper main unit by prohibiting the transmission of signals but also enables an improper main unit on some condition by for example changing the frame rate.

Further, the imaging unit may include a notification section for notifying a user that the main unit is improper when the main unit is identified as improper by the identification section. Furthermore, the notification section may cause the main unit to notify a user that the main unit is improper by sending a signal representing the main unit being identified as improper to the main unit.

In such a camera system, it is possible to make a user aware of the fact that a proper imaging unit is attached to an improper main unit. With this camera system, even if improper main units are available on the market, a user can quickly find such improper main units and take proper actions. In addition, if the signal transmission restricting section is configured such that it restricts signals to be sent to an improper main unit while allowing shooting as described above, a user may be notified of the fact that such restriction processing will be performed.

Still further, in the camera system according to the present invention, the identification section may receive at least a code defining the type of the main unit and identify the main unit based on the code.

With this additional feature, the signal transmission restricting section can restrict signals to be sent to a main unit according the type of the main unit.

Additionally, the main unit may include an identification section for identifying the imaging unit. In this case, the main unit may further include a signal receipt restricting section that restricts the receipt of signals sent from the imaging unit when the imaging unit is identified as improper by the identification section of the main unit. In addition, this main unit may further include a notification section for notifying a user that the imaging unit is improper when the imaging unit is identified as improper by the identification section of the main unit.

When the camera system is provided with these additional features, the main unit and the imaging unit can identify each other so that shooting can be restricted or prohibited by a proper one when either one is improper.

As described above, the camera system according to the present invention can prevent a proper unit to be attached to and used with an improper unit to take an image.

DETAILED DESCRIPTION OF THE INVENTION

Embodiments of the present invention will be described.

Figure 1:
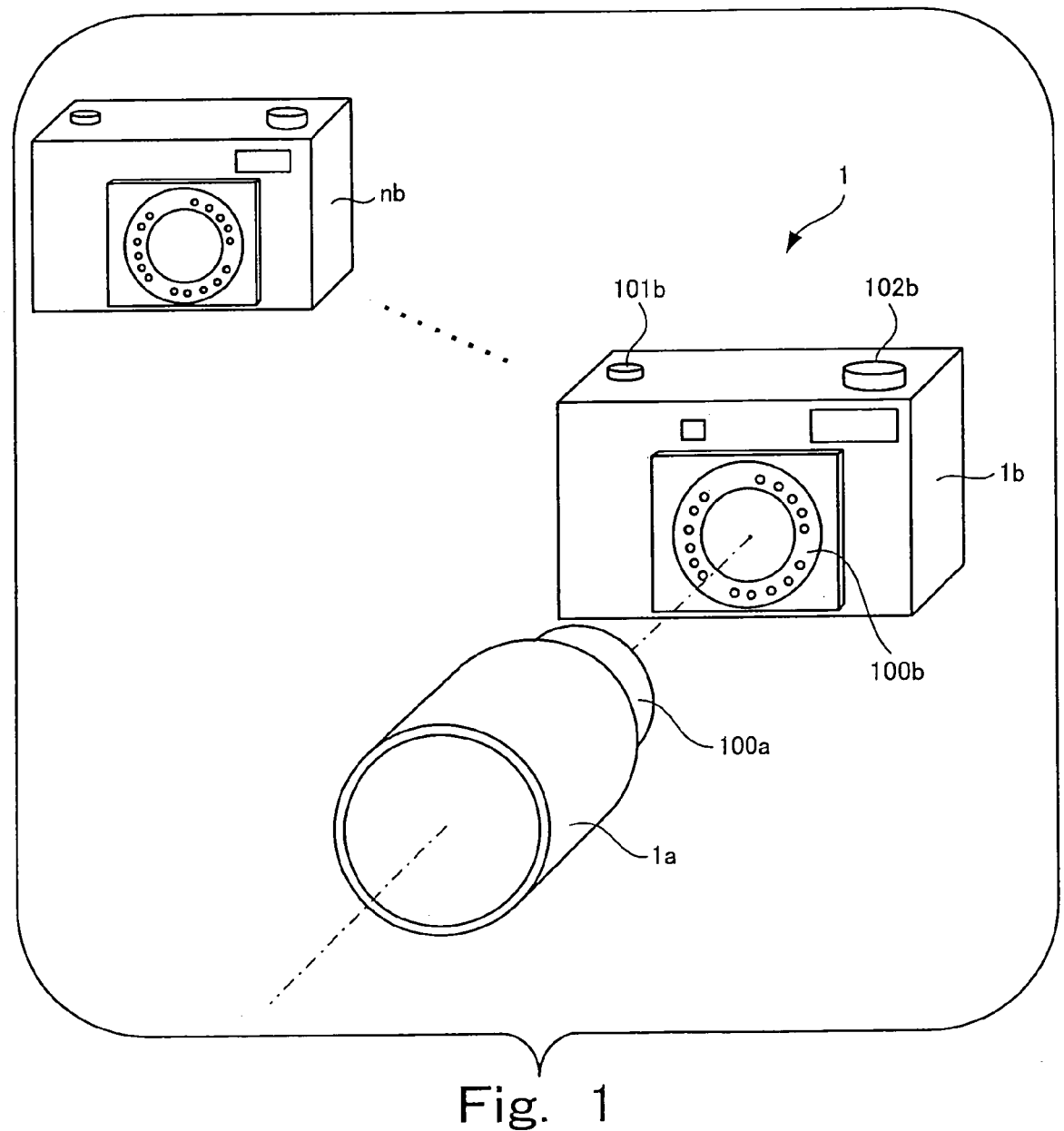
FIG. 1 is a diagram showing a camera system 1 according to a first embodiment of the present invention.

FIG. 1 shows a camera system 1 according to a first embodiment of the present invention.

The camera system 1 includes an imaging unit 1a and main units 1b through nb and is configured such that the imaging unit 1a can be detachably attached to any of these main units.

The imaging unit 1a shown in FIG. 1 is a proper one and the main units 1b through nb are plural types of main units to which the proper imaging unit 1a can be attached. The camera system 1 will be described assuming that the main units 1b through nb include an improper one (e.g. a main unit incompatible with the specification of the imaging unit, a completely counterfeit unit, etc.). The main unit 1b representing the main units 1b through nb shown in FIG. 1 has a release button 101b and a shooting mode dial 102b. The imaging unit 1a and the main unit 1b have mount sections 100a and 100b provided with multiple mount contacts, respectively. When the imaging unit 1a is attached to the main unit 1b, the mount contacts of both sides are mechanically connected to their counterparts so that the serial interfaces of both sides can be electrically connected to each other.

In this embodiment, when the imaging unit 1a shown in FIG. 1 is attached to any of the main units 1b through nb and subsequently the power is turned on, the imaging unit 1a identifies whether the attached main unit is proper or not via the interface because the main unit in use may be improper.

Figure 2:
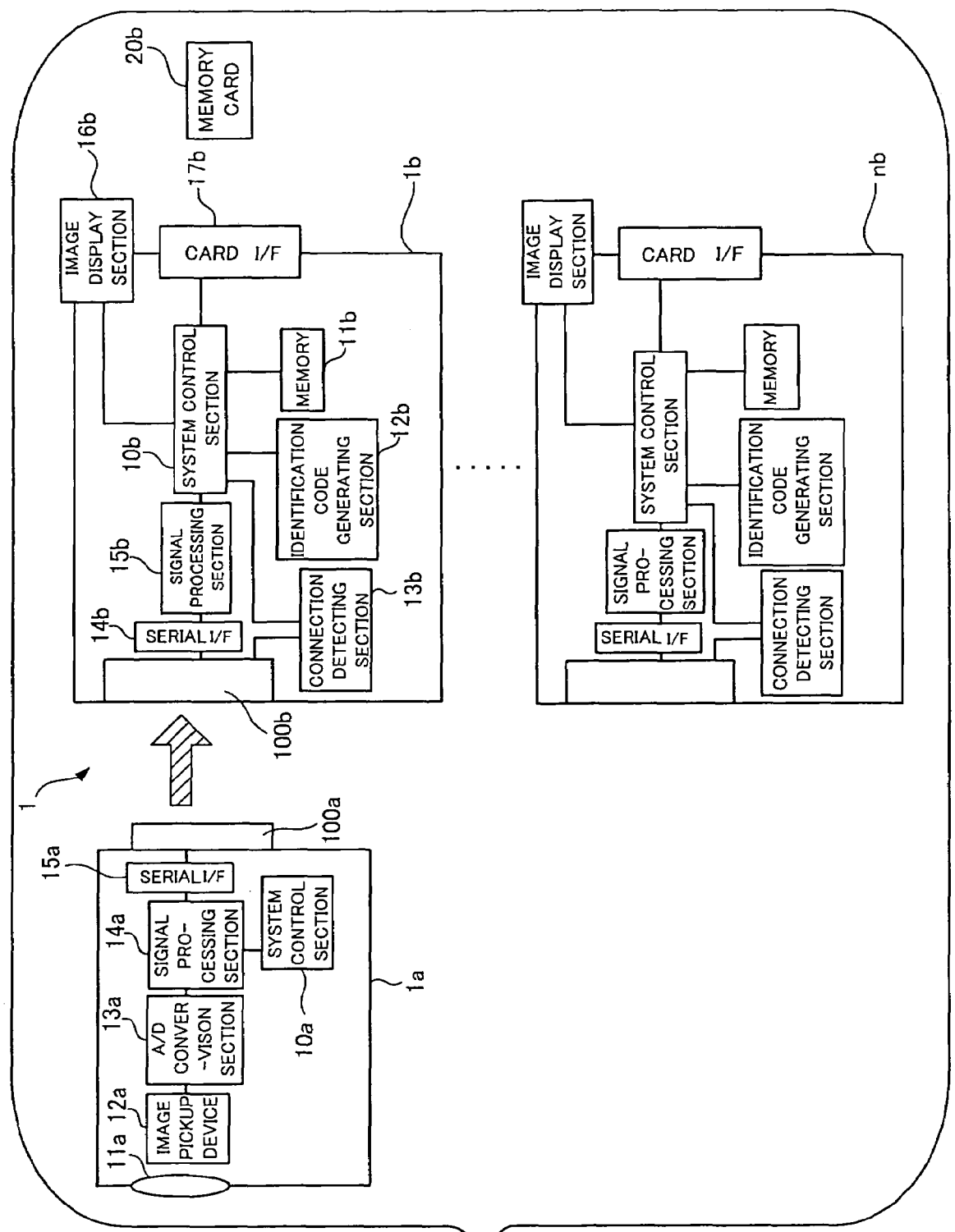
FIG. 2 is a diagram showing the internal structures of an imaging unit and main units shown in FIG. 1.

FIG. 2 shows the internal structures of the imaging unit 1a and the main units 1b through nb shown in FIG. 1.

The flow of image signals in the camera system 1 will be briefly described with reference to FIG. 2 assuming that the imaging unit 1a is attached to the main unit 1b.

The imaging unit 1a has an image-taking optical system 11a and an image pickup device 12a. The image-taking optical system 11a is equipped with a lens such as a focusing lens, a diaphragm (not shown), etc. The imaging unit 1a also has a system control section 10a and is so configured as to form a focused image of a subject on the image pickup device 12a by driving the focusing lens to make it constantly focus under the control of the system control section 10a. Further, the image pickup device 12a generates analog image signals that are subsequently output to an A/D conversion section 13a at predetermined intervals under the control of the system control section 10a. Subsequently, the analog image signals are converted into digital image signals in the A/D conversion section 13a. The digital image signals are then output to a signal processing section 14a and subjected to signal processing therein. The signals subjected to the signal processing are then supplied to the main unit 1b via a serial interface (hereinafter referred to as "serial I/F") 15a that is also controlled by the system control section 10a.

Image signals flow in this manner within the imaging unit 1a.

Now, there will be described how the main unit 1b handles the received image signals.

The main unit 1b shown in FIG. 2 has a system control section 10b whose name is the same as the system control section 10a of the imaging unit 1a. In order to avoid confusion, the system control section 10a of the imaging unit 1a will be referred to as the "first system control section 10a" while the system control section 10b of the main unit 1b will be referred to as the "second system control section 10b." Further, the main unit 1b has a serial I/F 14b whose name is the same as the serial I/F 15a of the imaging unit 1a and therefore, similarly, the serial I/F 15a of the imaging unit 1a will be referred to as the "first serial I/F 15a" while the serial I/F 14b of the main unit 1b will be referred to as the "second serial I/F 14b." Furthermore, the main unit 1b has a signal processing section 15b whose name is the same as the signal processing section 14a of the imaging unit 1a and therefore, similarly, the signal processing section 14a of the imaging unit 1a will be referred to as the "first signal processing section 14a" while the signal processing section 15b of the main unit 1b will be referred to as the "second signal processing section 15b."

Likewise, when the imaging unit 1a and the main unit 1b share common section names other than the above-mentioned sections, such sections of the imaging unit 1a will be prefixed with "first" while those of the main unit 1b will be prefixed with "second".

As shown in FIG. 2, the entire operations of the main unit 1b are controlled by the second system control section 10b.

The main unit 1b has a connection detecting section 13b for detecting the attachment and detachment of the imaging unit 1a. Upon attachment of the imaging unit 1a to the main unit 1b, the connection detecting section 13b notifies the second system control section 10b that the imaging unit 1a is attached.

Subsequently, under the control of the second system control section 10b, the main unit 1b receives via the second serial I/F 14b image signals sent through the first serial I/F 15a and supplies the received image signals to the second signal processing section 15b where they are subjected to signal processing. The image signals subjected to the signal processing in the second signal processing section 15b are supplied to an image display section 16b so that an image can be displayed by the image display section 16b based on the image signals under the control of the second system control section 10b. If the second system control section 10b detects the press of the release button 101b (refer to FIG. 1) while the image is displayed by the image display section 16b, the second system control section 10b supplies a release signal to the first system control section 10a of the imaging unit 1a via the serial I/Fs 14b and 15a, thereby allowing the first system control section 10a to start exposure control of the image pickup device 12a. After a lapse of predetermined seconds, the first system control section 10a causes the image pickup device 12a to output image signals and the first serial I/F 15a to transmit image signals to the main unit 1b. Subsequently, the second system control section 10b causes the second serial I/F 14b to receive the image signals sent from the imaging unit 1a and further to supply the received signals to the second signal processing section 15b. After that, the second system control section 10b causes the second signal processing section 15b to subject the image signals to signal processing and further to supply the image signals subjected to the signal processing to a card I/F 17b so that the card I/F 17b can record the image signals in a memory card 20b.

The above-described operations are performed when a proper image unit is attached to a proper main unit and the power is turned on. However, if these operations are performed when the imaging unit 1a is attached to an improper main unit (e.g. a main unit incompatible with the specification of the imaging unit, a completely counterfeit unit, etc.), the second signal processing section 15b of the attached main unit may perform inappropriate signal processing.

For this reason, the camera system 1 according to the present embodiment is so configured as to have an identification section (an identification function provided in the system control section 10a in the present embodiment) in the imaging unit 1a, allowing the imaging unit 1a, rather than the main unit, to identify a proper main unit to which the imaging unit 1a is attached.

In the present embodiment, the first system control section 10a of the imaging unit 1a sends, to the second system control section 10b of the main unit 1b, a request for the transmission of the identification code by controlling the serial I/F 15a. In response to the request, an identification code generating section 12b of the main unit 1b generates the identification code thereof and the generated identification code is sent to the imaging unit 1a. Subsequently, the first system control section 10a identifies whether the main unit 1b is proper or not based on the identification code. In the present embodiment, the identification code generated by the identification code generating section 12b is a code defining the type of the main unit 1b. Upon receipt of the identification code, the first system control section 10a of the imaging unit 1a performs identification by verifying the received identification code against a code list of the identification codes of compatible models stored beforehand in the first system control section 10a.

After the identification, if the first system control section 10a serving as the identification section determines that the main unit 1b is improper, the first system control section 10a performs processing to restrict the transmission of image signals by controlling the serial I/F 15a.

For example, if the code list does not include the identification code obtained from the main unit 1b, the first system control section 10a may determine that the main unit 1b is a counterfeit unit and perform processing to prohibit the transmission of signals at the serial I/F 15a and to issue an error code. Alternatively, if the code list includes the same code as the identification code obtained from the main unit 1b and indicates that the specification (e.g. frame rate value) of the imaging unit 1a does not match with that of the main unit 1b, the first system control section 10a may transmit image signals with an error code after restricting the frame rate by controlling the serial I/F 15a. In this manner, shooting can be allowed on a certain condition if the main unit 1b is incompatible with the imaging unit 1a but it is compatible with other imaging units.

The present embodiment is also configured such that upon receipt of any of these error codes, the second system control section 10b of the main unit 1b causes the image display section 16b to notify a user that the main unit 1b is improper by displaying an error.

Accordingly, for example, it is possible to inform a user that the main unit 1b is a counterfeit unit, or that shooting is allowed although the performance of the imaging unit 1a is not sufficiently utilized, if the specification of the main unit 1 is different from that of the imaging unit 1a.

The first system control section 10a corresponds to the "identification section" according to the invention, and the combination of the first system control section 10a and the serial I/F 15a corresponds to the "signal transmission restricting section" according to the invention. The combination of the first system control section 10a, the second system control section 10b and the image display section 16b corresponds to the "notification section" according to the invention.

In the present embodiment, although an error is displayed by using the image display section 16b of the main unit b1, it may be displayed in the imaging unit 1a side or a warning sound may be emitted.

In addition, although identification is performed by controlling the serial I/Fs 15a and 14b in the present embodiment, it may be performed through data transmission in a non-contact manner. For example, a RFID tag may be affixed to the imaging unit 1a or the main unit 1b near the contact surface and the main unit 1b may be identified before the serial I/Fs 15a and 14b come into contact with each other.

Figure 3:
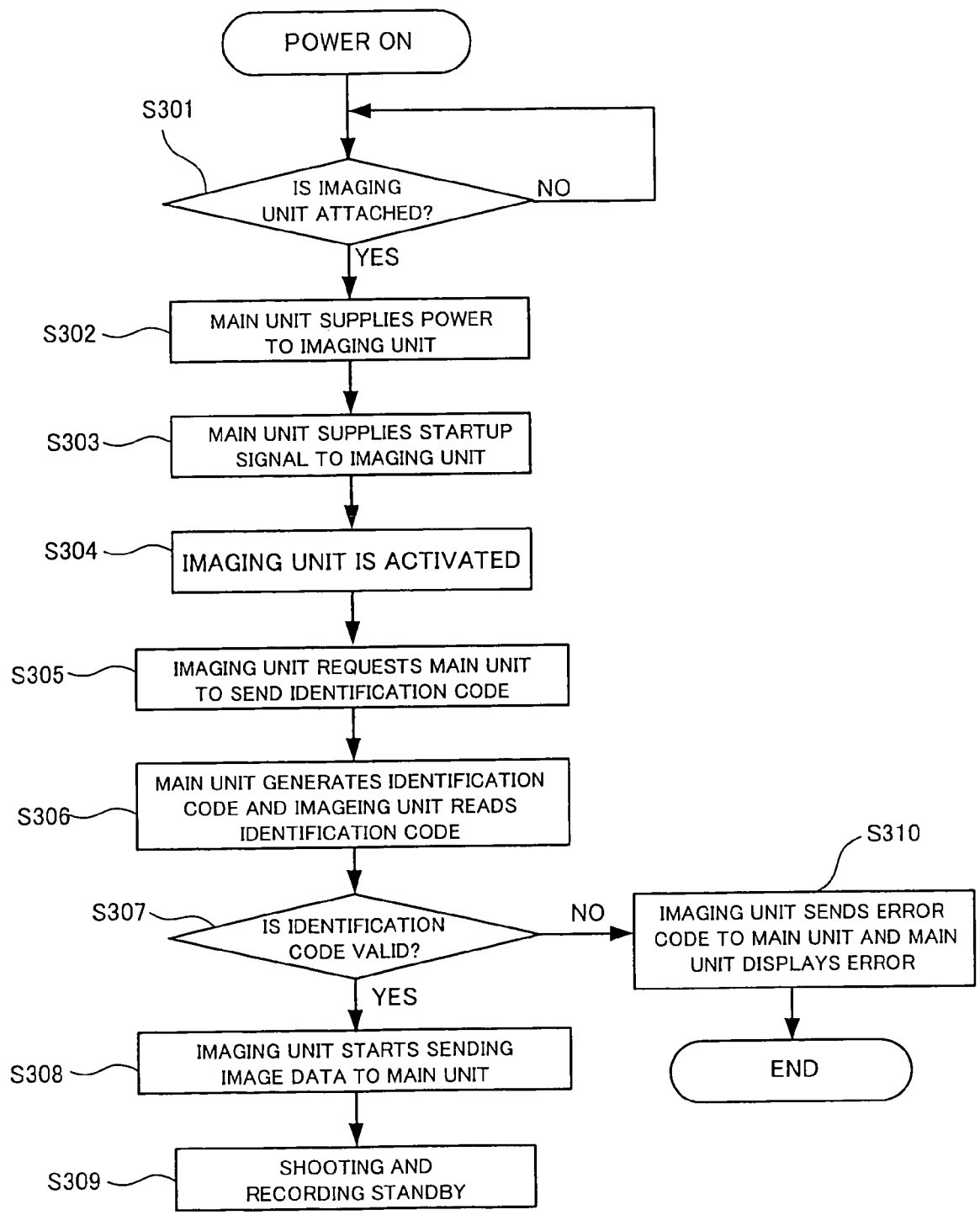
FIG. 3 is a flow chart showing an identification processing procedure performed by a first system control section.

FIG. 3 is a flowchart showing an identification processing procedure performed by the first system control section 10a.

In the camera system 1 shown in FIG. 2, the first system control section 10a of the imaging unit 1a performs processing for identifying the main unit 1b in cooperation with the second system control section 10b and therefore, FIG. 2 shows the signal flow in the processing performed by the first system control section 10a and the second system control section 10b.

Similarly, FIG. 3 shows processing performed by the first system control section 10a and that performed by the second system control section 10b.

When the power is turned on, the processing of the flowchart in FIG. 3 begins.

At step S301, the second system control section 10b determines whether the imaging unit 1a is attached to the main unit 1b or not based on the result of the detection by the connection detecting section 13b. If the second system control section 10b determines that the imaging unit 1a is attached at this step S301, the flow goes to a YES route. Subsequently, at step S302, the second system control section 10b orders a power section (not shown) to supply power to the imaging unit 1a through the mount contacts. After supplying the power to the imaging unit 1a, the second system control section 10b supplies a startup signal to the imaging unit 1a at step S303 to activate the imaging unit 1a.

When the imaging unit 1a is activated at step S304, the first system control section 10a issues to the main unit 1b a request for the transmission of the identification code at step S305. In response to the request, the second system control section 10b of the main unit 1b sends the identification code generated by the identification code generating section 12b to the first system control section 10a and the identification code is then read by the first system control section 10a at step S306. Subsequently, at step S307, the first system control section 10a serving as the identification section identifies the main unit 1b by verifying the identification code thereof.

If it is determined that the main unit 1b is proper by the first system control section 10a at step S307, the flow goes to step S308 where the first system control section 10a causes the first serial I/F 15a to start sending out image signals by controlling the first serial I/F 15a. Upon receipt of the image signals from the imaging unit 1a by the main unit 1b, the second system control section 10b of the main unit 1b causes the image display section 16b to display an image based on the received image signals and thereafter the second system control section 10b enters a shooting and recording standby state.

If it is determined that the main unit 1b is improper by the first system control section 10a at step S307, the flow goes to step S310 where the first system control section 10a causes the first serial I/F 15a to send out an error code to the main unit 1b by controlling the first serial I/F 15a. Upon receipt of the error code, the second system control section 10b of the main unit 1b causes the image display section 16b to display an error.

Thanks to such an error notification, a user becomes aware of the fact that the main unit 1b is improper. If the user is notified of the fact that the main unit 1b is a counterfeit unit, the user can quickly react, for example, he/she can report to the police. Alternatively, if the user is notified of the fact that shooting is restricted due to the difference in specification between the imaging unit 1a and the main unit 1b, the user can carry out shooting while being aware of such a restriction.

As described above, it is possible to implement a camera system that prevents a proper imaging unit from being attached to and used with an improper main unit according to the present embodiment.

Meanwhile, although the wire I/F is used as an example in the above-described embodiment, a wireless I/F may be employed. If a wireless I/F is used, it is possible to identify whether or not the main unit is an improper unit such as a counterfeit one without attaching the imaging unit thereto.

In addition, although the camera system 1 having the imaging unit 1a provided with the identification section is used in the above embodiment as an example of the camera system that prevents a proper imaging unit from being attached to and used with an improper main unit, it is expected that an improper imaging unit may be attached to a proper main unit. Accordingly, it is preferable to provide an identification section in each of the imaging unit and the main unit so that they can identify each other.

Figure 4:
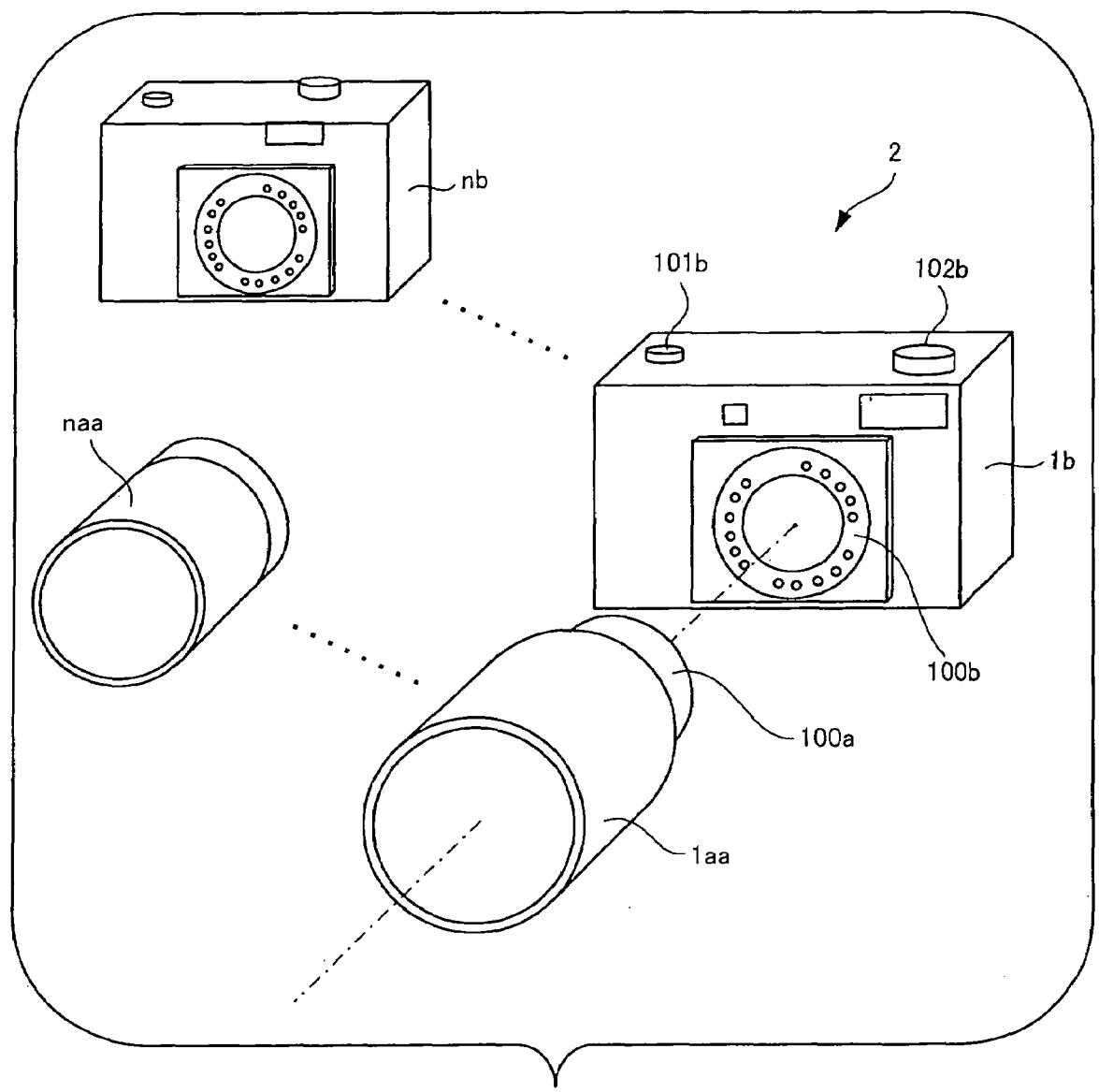
FIG. 4 is a diagram showing a camera system according to a second embodiment of the present invention.

FIG. 4 shows a camera system 2 according to a second embodiment of the present invention, which has been improved to perform mutual identification.

FIG. 4 shows imaging units 1aa through naa which include an improper one and main units 1b through nb that also include an improper one. Although only the imaging unit has the identification section in FIG. 1, both the imaging unit and the main unit have the respective identification sections in FIG. 4. In the description of the second embodiment, the same elements as those of the first embodiment are denoted by the same names and reference characters as those of the first embodiment.

Figure 5:
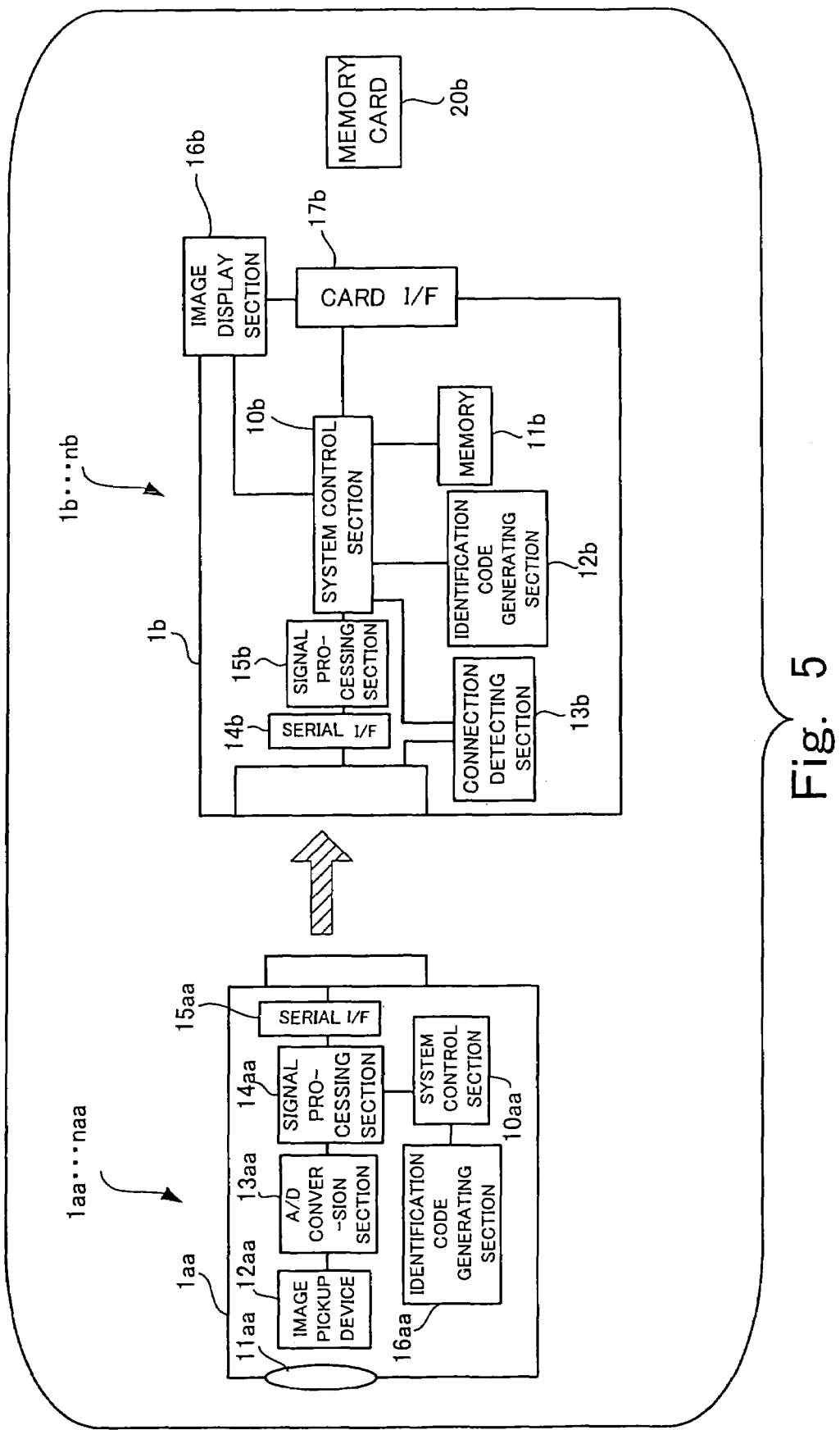
FIG. 5 is a diagram showing the internal structures of imaging units and main units composing the camera system shown in FIG. 4.

FIG. 5 shows the internal structures of the imaging unit 1aa and the main unit 1b each illustrated as a representative example of those shown in FIG. 4.

As shown in FIG. 5, the second system control section 10b of the main unit 1b is provided with an identification function and the imaging unit 1aa is provided with an identification code generating section 16aa serving as an important element for identification performed by the second system control section 10b. The camera system 2 is thus improved to enable both the imaging unit 1aa and the main unit 1b to identify each other.

As illustrated in FIG. 5, the imaging unit 1aa has the identification code generating section 16aa that generates an identification code. In response to a request for the transmission of the identification code provided from the second system control section 10b, the generated identification code is sent to the second system control section 10b via interface under the control of a first system control section 10aa. The second system control section 10b identifies whether the imaging unit 1aa is proper or not upon receipt of the identification code. The second system control section 10b corresponds to the "identification section" according to the invention. In this embodiment, based on the result of the identification performed by the second system control section 10b, the second system control section 10b itself performs processing (which includes receipt prohibiting processing) to restrict the receipt of image signals at the second serial I/F 14b by controlling the second serial I/F 14b. Alternatively, based on the result of the identification, the second system control section 10b causes the image display section 16b to display an error. The second system control section 10b corresponds to each of the "identification section," "notification section," and "signal receipt restricting section" according to the invention.

If the first system control section 10aa of the imaging unit 1aa also identifies the main unit 1b and determines that it is improper, in a manner similar to the first embodiment, the first system control section 10aa restricts the transmission of image signals by controlling a first serial I/F 15aa and issues an error code to the main unit 1b in response to the result of the identification.

Figure 6:
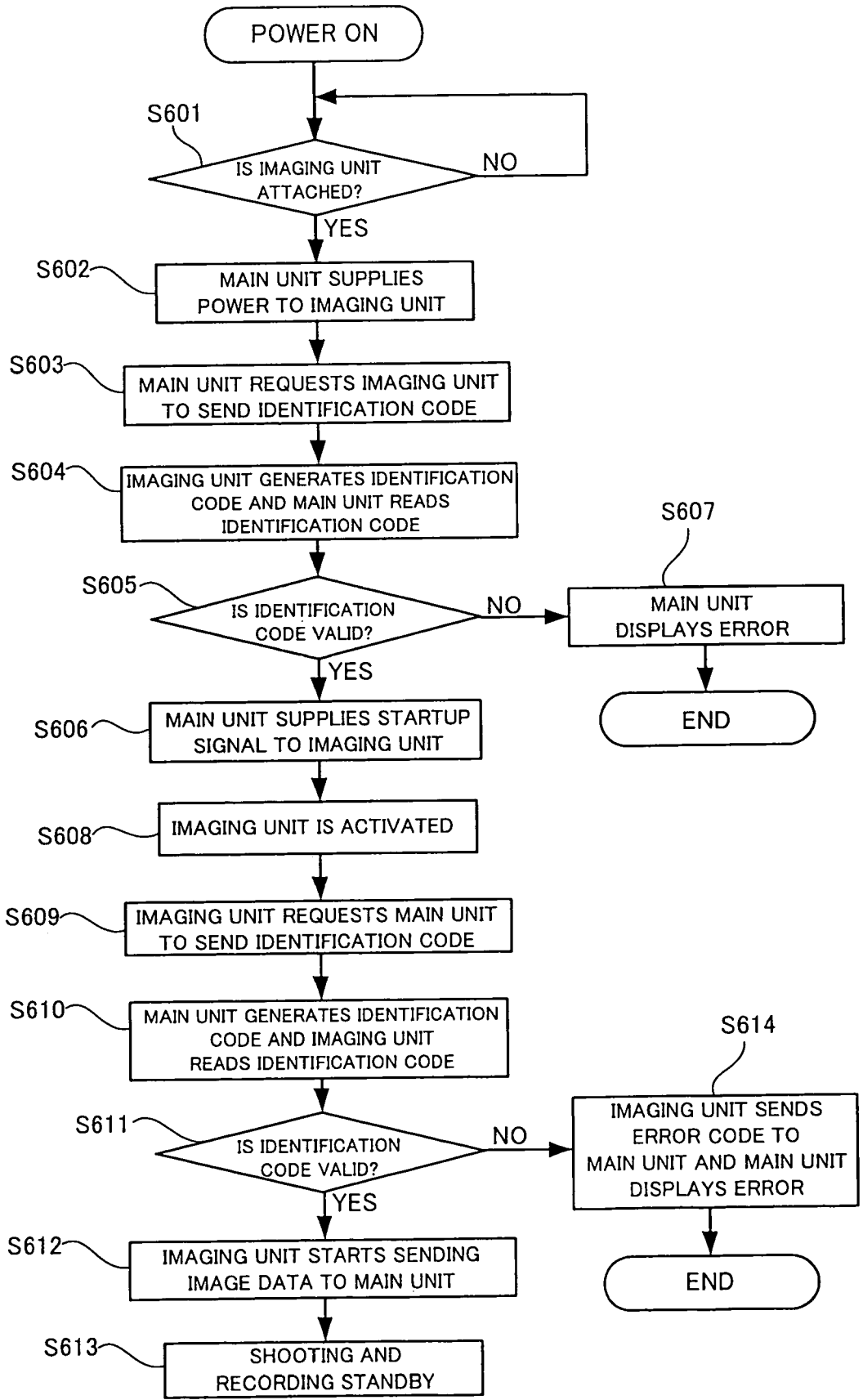
FIG. 6 is a flow chart showing an identification processing procedure mutually performed by a first system control section and a second system control section.

FIG. 6 is a flowchart showing a mutual identification processing procedure performed by the first system control section 10aa serving as the identification section of the imaging unit 1aa and the second system control section 10b serving as the identification section of the main unit 1b in cooperation with each other.

The flowchart shown in FIG. 6 is similar to that shown in FIG. 3 except that FIG. 6 includes steps S603 through S607 that are steps for identifying the imaging unit 1*aa* by the main unit 1*b* and therefore only relevant steps S601 through S607 will be described below.

If the attachment of the imaging unit 1*aa* is detected by the second system control section 10*b* at step S601, the flow goes to step S602 where the second system control section 10*b* orders a power section (not shown) to supply power to the imaging unit 1*aa*. Subsequently, at step S603, the second system control section 10*b* of the main unit 1*b* issues to the imaging unit 1*aa* a request for the transmission of the identification code. In response to the request, the first system control section 10*aa* of the imaging unit 1*aa* reads the identification code generated by the identification code generating section 16*aa* at step S604 and sends it to the main unit 1*b* via the serial I/F 15*aa*. Upon receipt of the identification code, the second system control section 10*b* of the main unit 1*b* verifies the identification code at step S605.

If it is determined that the imaging unit 1*aa* is proper by the second system control section 10*b* at step S605, the flow goes to step S606 where the second system control section 10*b* activates the imaging unit 1*aa*. Thereafter, steps 608 through S614 are performed in a manner similar to the steps following S303 in FIG. 3, which are processing for identifying the main unit by the imaging unit.

If it is determined that the imaging unit 1*aa* is improper by the second system control section 10*b* at step S605, the flow goes to step S607 where the second system control section 10*b* causes the image display section 16*b* to display an error by controlling the image display section 16*b*, and the flow ends.

As described above, according to the second embodiment, it is possible to implement a camera system that prevents a proper imaging unit from being attached to and used with an improper main unit and that prevents an improper imaging unit from being attached to and used with a proper main unit as well.

Meanwhile, if both are improper units, identification may not be performed because neither of them has an identification section. However, if, at least, either of an imaging unit and a proper main unit is proper, the proper one identifies the improper one without fail according to the second embodiment.

By configuring the camera system in this way, it is possible to prevent the use of combination of a proper unit and improper one. Thus, in a case where a counterfeit unit is found, the distribution of the counterfeit unit can be stopped by quickly taking proper action.

In the first embodiment described with reference to FIGS. 1 through 3, the system control section of the imaging unit adapts the specification thereof to the specification of the main unit. However, in the second embodiment described with reference to FIGS. 4 through 6, the respective system control sections of both the imaging unit and the main unit adopt their specification to the specification of either one of them. Therefore, the second embodiment can implement a camera system more flexible than the first embodiment.

What is claimed is:

1. A camera system comprising:
   an imaging unit which has an image-taking optical system and an image pickup device; and
   a main unit which receives image signals from the imaging unit, performs signal processing and supplies power to the imaging unit whether or not the main unit is proper, wherein the imaging unit includes an identification section for identifying the main units the imaging unit includes a signal transmission restricting section that restricts signals to be sent to the main unit when the main unit is identified as improper by the identification section and the signals to be sent to the main unit are different from the power supplied to the imaging unit.

2. The camera system according to claim 1, wherein the imaging unit includes a notification section for notifying a user that the main unit is improper when the main unit is identified as improper by the identification section.

3. The camera system according to claim 2, wherein the notification section causes the main unit to notify a user that the main unit is improper by sending a signal representing the main unit being identified as improper to the main unit.

4. The camera system according to claim 1, wherein the identification section receives at least a code defining the type of the main unit and identifies the main unit based on the code.

5. The camera system according to claim 1, wherein the main unit includes an identification section for identifying the imaging unit.

6. The camera system according to claim 5, wherein the main unit includes a signal receipt restricting section that restricts the receipt of signals sent from the imaging unit when the imaging unit is identified as improper by the identification section of the main unit.

7. The camera system according to claim 5, wherein the main unit includes a notification section for notifying a user that the imaging unit is improper when the imaging unit is identified as improper by the identification section of the main unit.

8. The camera system according to claim 3, wherein the notification section notifies a user that performance of the imaging unit is not fully utilized.

9. The camera system according to claim 3, wherein the notification section notifies a user that the imaging unit will not function on the main unit.

10. The camera system according to claim 1, wherein the main unit includes an RFID tag to be read by the identification section of the imaging unit for identifying the main unit.

11. The camera system according to claim 5, wherein the imaging unit includes an RFID tag to be read by the identification section of the main unit for identifying theimaging unit.

12. The camera system according to claim 1, wherein the identification section identifies the main unit based on an identification code of the main unit.

13. A camera system comprising:
    an imaging unit which has an image-taking optical system and an image pickup device; and
    a main unit which receives image signals from the imaging unit, performs signal processing and supplies power to the imaging unit whether or not the main unit is proper, wherein the imaging unit includes an identification section for identifying the main unit, the imaging unit includes a signal transmission restricting section that restricts signals to be sent to the main unit when the main unit is identified as improper by the identification section, the signals to be sent to the main unit are different from the power supplied to the imaging unit, the imaging unit includes a notification section for notifying a user that the main unit is improper when the main unit is identified as improper by the identification section, the main unit includes an identification section for identifying the imaging unit, the main unit includes an RFID tag to be ready by the identification section of the imaging unit for identifying the main unit and the imaging unit includes an RFID tag to be read by the identification section of the main unit for identifying the imaging unit.

* * * * *